April 2, 1963 P. RAIBOURN 3,084,212
NARROW-GATE PULSING OF POST DEFLECTION COLOR TUBE
Filed April 27, 1956
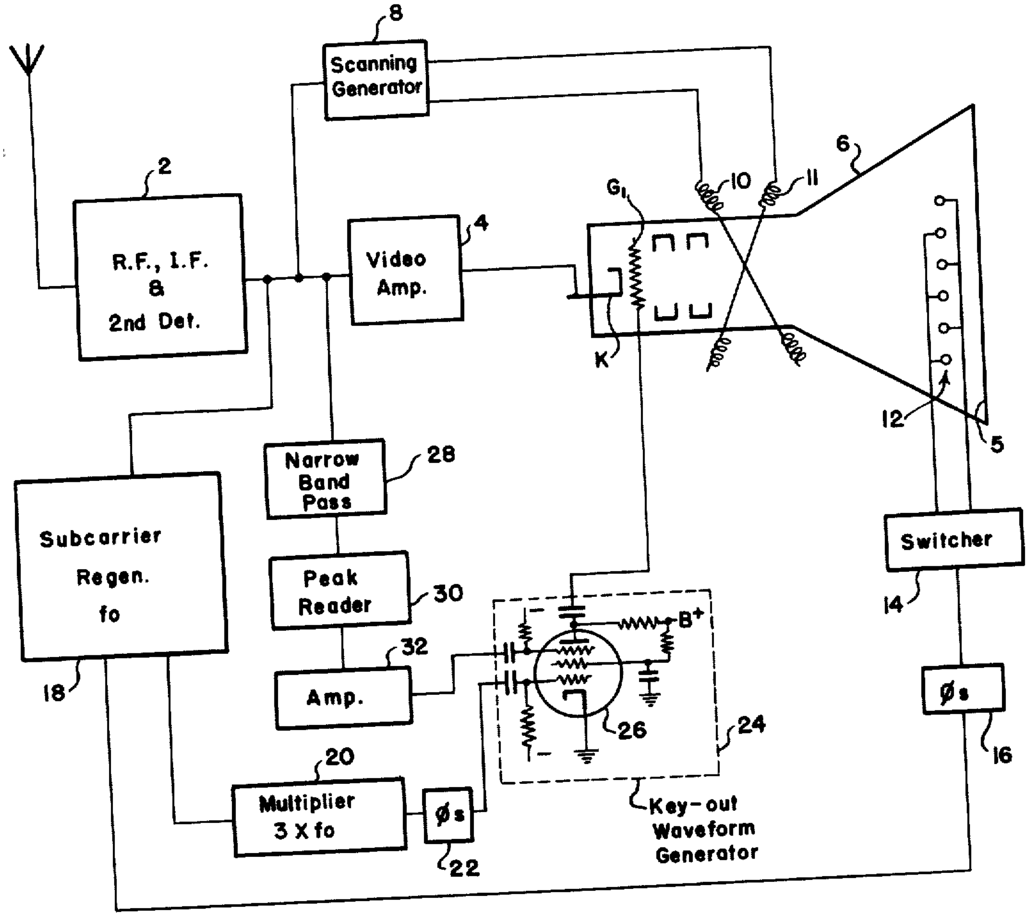
INVENTOR
Paul Raibourn
BY
Pennie, Edmonds, Morton, Barrows & Taylor
ATTORNEYS United States Patent Office 3,084,212

Patented Apr. 2, 1963

3,084,212

NARROW-GATE PULSING OF POST DEFLECTION COLOR TUBE

Paul Raibourn, Southport, Conn. (% Chromatic Television Lab. Inc., Paramount Bldg., Times Square, New York, N.Y.)

Filed Apr. 27, 1956, Ser. No. 581,054
9 Claims. (Cl. 178—5.4)

This invention relates to color television, and particularly to the reception and display of color television signals of the color subcarrier type. The invention provides a method and means whereby such signals may be displayed with increased brightness and with improved saturation as to colors.

The invention has particular application to television receiving and display equipment of the "self-decoding" type, as applied to the reception and display of color subcarrier television signals such as those of the presently approved N.T.S.C. system approved by the FCC on December 17, 1953. In these signals the total video signal, for example as taken off the radio frequency carrier at a receiving station, includes in addition to synchronizing signals (of which the color subcarrier burst is a part), a luminance component occupying a wide band of frequencies extending nominally from zero to 4 mc. and a chrominance component in the form of two sets of side bands on a suppressed subcarrier, the side bands occupying a region from approximately 2 to 4 mc. in the luminance video band. This chrominance component actually represents relatively low frequency variations in the chromaticity of the material being televised—variations at frequencies up to approximately 0.5 and 1.5 mc. according to the hues involved.

In one known form of receiver for color television signals of the color subcarrier type, the color subcarrier is reinserted and the chrominance signal is then detected, to make available in the 0.0 to 0.5 and in the 0.0 to 1.5 mc. frequency ranges, voltages representatives of the chromaticity variations to be reproduced. These voltages are then suitably combined with the luminance component for presentation in a display device.

In self-decoding displays the process of detection of the chrominance from its subcarrier or the equivalent thereof is achieved, in cathode-ray tube displays, by a supplementary deflection of a cathode-ray beam at color subcarrier rate or a multiple thereof and by a disposition of the color producing phosphor areas on the tube screen such that within the color subcarrier cycle the beam, modulated with the luminance and with the undetected chrominance side bands, is brought at suitable phases of the color subcarrier cycle onto areas responsive to electron impact in the primary colors of the system of colors employed. The total video signal as extracted from the radio frequency carrier, suitably processed and amplified, is sampled at phases of the color subcarrier cycle referable to the primary colors of the system of colors employed, and these samples are used to modulate the cathode-ray beam, the supplementary scanning being so phased that during the sampling intervals in which the beam carries modulation referable to one color, the beam is directed to phosphor areas luminous in that phosphor area, and so on.

For good color rendition, these sampling intervals aggregate substantially less than the complete color subcarrier cycle and thus impose a limited duty cycle at which the cathode-ray tube is operated, i.e. the percent of the time during which information is being presented and light generated on the cathode-ray screen. Hence this duty cycle limits the brightness of the reproduced picture. The invention provides a method and means whereby, on the average, the duty cycle may be substantially raised, with consequent increase in brightness. In accordance with the invention the angular width of the gates or sampling intervals is caused to vary inversely with the saturation of the colors in the subject matter to be reproduced, narrow gate widths being employed for saturated colors and wide gates for unsaturated colors. In the preferred form of the invention the gating or keying in of the cathode-ray beam at phases referable to the primary colors is replaced by an equivalent process in which the cathode-ray beam is keyed out or suppressed at phases referable to the colors complementary to the primary colors in the system of additive colors employed, the width of such key-out gates being made to vary directly with the saturation of the colors to be reproduced, as measured by the amplitude of the chrominance component.

The invention will now be described with reference to the accompanying drawings in which the single figure of drawings is a block diagram illustrating one form of television receiver suitable for practice of the invention.

In the figure there are indicated at block 2 the components of a television receiver performing the functions of R.F. amplification, I.F. amplification and second detection, with or without one or more stages of video amplification. A sync signal separator and scanning generator 8 which, like the unit 2, may be of conventional design, accepts as its input signal the video detected at unit 2 and develops sawtooth voltages for application to field and line scanning coils 10 and 11 associated with a picture display cathode-ray tube 6. For simplicity the sound channel components have been omitted from the figure.

For the reproduction of television images in color, the receiver of the drawings includes as a display device a cathode-ray tube 6 which may desirably be of the single-gun type disclosed in Patent No. 2,692,532. Such cathode-ray tubes include a phosphor screen made up of strips typically of red, green and blue phosphors, the strips being laid down in a repeating cyclic order which may for example be red, green, blue, green. Adjacent the phosphor screen there is provided within the tube a grid of fine wires or other linear conductors stretched parallel to the length of the strips with one conductor electron optically centered, as regards the gun, in front of each blue and each red strip. The conductors opposite the red strips are connected to one terminal, and the wires opposite the blue strips are connected to another to form a switching grid of interlaced conductors. Alternating "switching voltages may be applied between the two sets of interlaced grid conductors to deflect the cathode-ray beam to the red or blue strips according to the polarity of the applied voltage, or to permit it to pass to the green strips when the applied voltage is zero or nearly so. Preferably an accelerating voltage is applied between the grid as a whole and a conducting electron-transparent layer which covers the screen of phosphor strips. Cathode-ray tubes employed in the invention may however be applied with other arrangements of phosphor strips than the red, green, blue, green order just described.

Upon the application between the two halves of the switching grid of such a tube of a sinusoidal voltage at color subcarrier frequency, the focal position between any pair of adjacent grid conductors is caused to pass, within the color subcarrier cycle, over areas luminescent in all three of the primary colors. If in such a tube there is applied to an intensity controlling electrode such as the cathode $k$ in the tube of the figure, the complete N.T.S.C. video signal and if this video signal is effectively sampled by gating or "keying in" the tube above a cut-off bias level on another intensity controlling electrode by means of a third harmonic of the color subcarrier at phases conforming as nearly as possible to the phases in the color subcarrier cycle at which the amplitude of the chrominance is proportional to the red, green and blue contributions to the subject matter televised, an automatic decoding of the chrominance in the applied video signal will be effected if the switching voltage applied to the switching grid is phased so that when the video is sampled for one color the electron beam is directed to an area of that color, and so on.

The figure illustrates the application of the invention to display by means of a tube of this type. The total video signal extracted in unit 2 is applied in proper polarity, through a video amplifier 4, to an intensity controlling electrode such as the cathode *k* in tube 6. The switching grid 12 of the tube 6 is energized with a switching voltage by means of a switching generator 14 which is coupled through a phase shifting unit 16 to a subcarrier regenerator 18. The regenerator 18 reconstitutes from the burst in the received synchronizing signals a continuous wave oscillation at color subcarrier frequency, fixed in phase relation to the phase reference in the received chrominance.

According to the invention the total video applied to the tube 6, including of course the luminance, is allowed effectively to modulate the cathode-ray beam during portions of the color subcarrier cycle centered, approximately on phases such as the phases of the red, green and blue chrominance vectors of that cycle which are similarly referable to the red, green and blue primaries, the width of these portions being adjusted to vary inversely with the saturation of the colors. To this end, in the embodiment illustrated in the drawings, the bias conditions in the tube are so adjusted as to position the cathode above cut off. In addition a key-out voltage is applied to another intensity controlling electrode such as the first control grid $G_1$ to cut the tube off for intervals of the color subcarrier cycle centered on phases of that cycle 180° displaced respectively from the phases referable to the red, green and blue primaries about which the video signal applied to the cathode is to be sampled. The width of these key-out intervals is varied directly with the saturation of the colors to be reproduced.

In the embodiment illustrated in the drawings the phases at which the detected video is to be sampled for energization of the cathode-ray beam are those of the red, green and blue chrominance vectors in the color subcarrier cycle. In the N.T.S.C. signals these are successively 137, 107 and 116° apart. The samples may then, with acceptable fidelity of hue, be spaced 120° apart so that the key-out voltage takes the form of three uniformly spaced pulses per color subcarrier cycle, as that cycle appears in the signal applied to the cathode *k* of tube 6. Generation of this key-out voltage begins with a harmonic generator or frequency multiplier 20 which is coupled to the subcarrier regenerator 18 and which develops a sinusoidal voltage at three times subcarrier frequency. The output of multiplier 20 is passed through a phase control network 22 to a key-out waveform generator indicated at the dash-line box 24.

Various circuits may be employed in the waveform generator 24 to develop the desired key-out waveform with pulses of width varying directly with the amplitude of the chrominance. The drawing shows the use of a clipper stage comprising a pentode tube 26 negatively biased on its first control grid to conduct only during positive half cycles of the voltage applied thereto by multiplier circuit 20. The waveform at the plate of tube 26 is then a series of negative-going pulses phased, approximately, at the phases of the color subcarrier cycle of the yellow, cyan and magenta complementaries of the red, green and blue primary colors. These negative going key-out pulses are then applied to the first control grid $G_1$ of tube 6.

The angular width of these key-out pulses is made to vary directly with the amplitude of the chrominance signal by means of a circuit which effectively measures the amplitude of the chrominance and applies a voltage varying directly with this measure as an unbiasing signal in the key-out waveform generating stage 24. A narrow pass band filter 28 which may for example be of the order of magnitude of a few hundreds of kilocycles wide in its pass band receives from the receiver component 2 the total video signal. The center of the pass band of filter 28 is set at the color subcarrier frequency. A peak detector 30 develops an output voltage proportional to or varying directly with the amplitude of the low frequency chrominance side bands which are allowed to pass through the filter 28, and this peak voltage is applied, amplified in an amplifier 32, if necessary, to the suppressor grid of tube 26. The amplitude, and hence also at any selected voltage level with respect to plate current cutoff the width (i.e. the time duration), of the negative pulses in the plate circuit of tube 26 are thus made to vary directly with the amplitude of the low frequency chrominance side bands.

The bias condition on the suppressor grid of tube 26 may advantageously be set so that when a black and white picture is being received, i.e. when the chrominance component of the received signal is zero, tube 26 will be cut off on its suppressor grid. Under these conditions the key-out pulses or intervals will be of zero width, and the gates or samples will total the complete color subcarrier cycle so that the cathode-ray beam modulated with the luminance component will be continuously active on the cathode-ray tube screen 5.

By keying out the excitation of the fluorescent screen in tube 6 for intervals varying directly with the amplitude of the chrominance, the receiver of the invention improves both the average brightness and the saturation of colors in the reproduced picture. When unsaturated colors are to be displayed, the width of the gates or samples allowed to reach the screen is substantially increased, improving the duty cycle at which the tube is operated. On the other hand, when saturated colors are to be reproduced, narrow gates are employed, insuring that the cathode-ray tube beam does not in its supplementary scanning by switching grid 12 strike, either at the beginning or at the end of a sample, areas on screen 5 of the wrong colors.

The circuits of the receiver shown in the drawings have been given primarily in block diagram form for the reason that combinations of circuit elements such as electron tubes, capacitors, resistors, inductances and so on capable of fulfilling the functions of the various blocks in this block diagram are known and can be found in the published literature by persons skilled in the art, once given for such block diagram components the statements of the essential nature thereof which have been set out herein. Indeed a color television receiver according to the invention may include various amplifying stages and other conventional components not shown in the drawings or described herein in order to adjust for gains and losses occurring in the various signal channels. Such matters and the making of suitable provision therefor are however well known to those skilled in the art.

While the drawings show discrete phase shifting circuits 16 and 22, identified by the notation "Øs," it will be understood that the necessary phase shifts may be obtained by adjustment and design of the circuit elements belonging to the associated circuits such as the subcarrier regenerator 18, switching unit 14 or frequency multiplier 20.

While the invention has been described herein in terms of a preferred embodiment, the invention as set forth in the appended claims is not limited thereto. For example while the embodiment illustrated effects a double modulation of the cathode-ray beam as a light excitation means in the cathode-ray tube, firstly with the extracted luminance video and chrominance side band signal and secondly with the key-out pulses, the signal inhering in the cathode-ray beam so doubly modulated can be generated at a prior stage of the receiver for application by single modulation to the light excitation means employed in the display device, whether a cathode-ray tube or not.

I claim:

1. The method of displaying color television signals of the color subcarrier type which comprises intensity modulating a cathode-ray beam with the combined luminance video and chrominance color subcarrier side bands in said signals, measuring the amplitude of low frequency components in said side bands, reducing the intensity of said beam for intervals cyclically over the color subcarrier cycle at phases thereof similarly referable to the colors complementary to the primary colors employed in said signals, varying the time duration of said intervals directly with the amplitude of said components, deflecting said beam in a pattern of lines and frames across a display surface to trace thereon a raster, and supplementarily deflecting said beam cyclically over the color subcarrier cycle to areas on said surface luminous in said primary colors successively.

2. In the reception and display of color television signals of the color subcarrier type wherein the total video signal applied to a radio frequency carrier includes a wide band of video frequencies representative of luminance and wherein the chrominance component appears as color subcarrier side bands above the lower limit of said wide band, the method which comprises detecting said video signal from said radio frequency carrier, modulating a beam of cathode rays with the video signal so detected, deflecting said beam across a display area in a pattern of lines and frames, further modulating said cathode-ray beam in cyclical fashion at three times color subcarrier frequency to take samples of said beam at successive phases of the color subcarrier cycle similarly referable to the primary colors of the system of colors employed in said color television signals, varying the width of said samples inversely with the amplitude of said chrominance component, and supplementarily deflecting said beam cyclically over the color subcarrier cycle to areas in said display area luminous upon electron impact in said primary colors.

3. In the reception and display of color television signals of the color subcarrier type wherein the total video signal applied to a radio frequency carrier includes a wide band of video frequencies representative of luminance and wherein the chrominance component appears as color subcarrier side bands above the lower limit of said wide band, the method which comprises detecting said video signal from said radio frequency carrier, modulating a beam of cathode rays with the video signal so detected, deflecting said beam across a display area in a pattern of lines and frames, cyclically keying in said cathode-ray beam for intervals varying inversely with the amplitude of said chrominance component at a frequency integrally related to the color subcarrier frequency to sample said beam at successive phases of the color subcarrier cycle similarly referable to the primary colors of the system of colors employed in said signals, and supplementarily deflecting said beam cyclically over the color subcarrier cycle to areas in said display areas luminous upon electron impact in said primary colors.

4. In the reception and display of color television signals of the color subcarrier type wherein the total video signal applied to a radio frequency carrier includes a wide band of video frequencies representative of luminance and wherein the chrominance component appears as color subcarrier side bands above the lower limit of said wide band, the method which comprises detecting said video signal from said radio frequency carrier, modulating a beam of cathode rays with the video signal so detected, deflecting said beam across a display area in a pattern of lines and frames, cyclically keying out said cathode-ray beam for intervals varying directly with the amplitude of said chrominance component at a frequency integrally related to the color subcarrier frequency to reduce the amplitude of said beam at successive phases of the color subcarrier cycle similarly referable to the colors complementary to the primary colors employed in said signals, and supplementarily deflecting said beam cyclically over the color subcarrier cycle to areas in said display area luminous upon electron impact in said primary colors.

5. A color television receiver for the display of color television signals of the color subcarrier type comprising means to extract from a radio frequency carrier a signal including a luminance video component and a chrominance color subcarrier side band component, a cathode-ray tube having a screen including a multiplicity of groups of areas luminescent on electron impact in the primary colors employed in said signals, means to modulate a cathode-ray beam in said tube with said extracted signal, means to generate an A.C. voltage at three times the frequency of the color subcarrier present in said extracted signal as applied to said beam, an electron tube amplifier receiving said A.C. voltage on a control electrode thereof, a band pass filter centered on color subcarrier frequency having its input coupled to the output of said extraction means, a peak voltage detector coupled to the output of said filter, means coupling the output of said detector to another control grid in said amplifier, means coupling the output of said amplifier to an intensity controlling electrode in said cathode-ray tube, means to deflect said beam across said screen in a pattern of lines and frames, and means to supplementarily deflect said beam over the color subcarrier cycle to areas on said screen luminescent in the primary colors of said signals respectively.

6. A color television receiver for the display of color television signals of the color subcarrier type comprising means to extract from a radio frequency carrier a signal including a luminance video component and a chrominance color subcarrier side band component, a cathode-ray tube having a screen including a multiplicity of groups of areas luminescent on electron impact in the primary colors employed in said signals, means to modulate a cathode-ray beam in said tube with said extracted signal, means to generate an A.C. voltage at three times the frequency of the color subcarrier present in said extracted signal as applied to said beam, an electron tube amplifier receiving said A.C. voltage on a control electrode thereof, said amplifier being biased to conduct during only a portion of the cycle of said A.C. voltage, a band pass filter centered on color subcarrier frequency having its input coupled to the output of said extraction means, a peak voltage detector coupled to the output of said filter, means coupling the output of said detector to another control grid in said amplifier, means coupling the output of said amplifier to an intensity controlling electrode in said cathode-ray tube, means to deflect said beam across said screen in a pattern of lines and frames, and means to supplementarily deflect said beam over the color subcarrier cycle to areas on said screen luminescent in the primary colors of said signals respectively.

7. The method of displaying color television signals of the color sub-carrier type which comprises extracting said signals from a radio-frequency carrier, developing from said extracted signals a voltage representative of the amplitude of the low frequency side bands of said color subcarrier in said extracted signals, modulating light exciting means in a display device with said extracted signals, developing sampling selector pulses having three times the frequency of the color sub-carrier in said signals as applied to said light exciting means, said pulses being frequency and phase controlled by color burst sync, modulating the time duration of said pulses in accordance with the value of said voltage, and further modulating said light exciting means with said time duration modulated pulses to excite light in said display device in primary colors with portions of the color sub-carrier cycle corresponding to the assigned primary color phase angles, the time duration of said pulses varying inversely with the amplitude of said low frequency side bands.

8. A receiver for the display of color television signals of the color sub-carrier type, said receiver comprising means to extract from a radio frequency carrier a signal including a luminance video component, a chrominance color sub-carrier side band component and burst sync, means to measure the amplitude of the low frequency side bands of said chrominance component, means to sample said signal for portions of the color sub-carrier cycle corresponding to the primary colors in said signals, said means including a sampling gate which is energized by said color television signal and by sampling selector pulses derived from brust sync, means to vary the width of said sampling selector pulses inversely with the amplitude of said low frequency side bands, and means to excite in a display device luminescence in said primary colors with the respective signal samples from said gate.

9. A receiver for the display of color television signals of the color sub-carrier type, said receiver comprising means to extract from a radio frequency carrier a signal including a luminance video component and a chrominance color sub-carrier side band component, means to measure the amplitude of the low frequency side bands of said chrominance component, a cathode-ray tube having a screen including a multiplicity of groups of areas luminescent on electron impact in the primary colors employed in said signals, means to modulate a cathode-ray beam in said tube with said extracted signal, means to develop sampling selector pulses at three times the frequency of the color sub-carrier appearing in said extracted signal as applied to said beam, said pulses being derived from and frequency controlled by burst sync, means to modulate said beam negatively with said pulses at phase angles corresponding to the colors complementary to said primary colors, and means to vary the width of said pulses directly with the amplitude of said low frequency side bands.

References Cited in the file of this patent

UNITED STATES PATENTS

| | | |
|---|---|---|
| 2,725,418 | Sziklai | Nov. 29, 1955 |
| 2,734,940 | Loughlin | Feb. 14, 1956 |
| 2,744,952 | Lawrence | May 8, 1956 |
| 2,745,899 | Maher et al. | May 15, 1956 |
| 2,759,993 | Loughlin | Aug. 21, 1956 |
| 2,858,366 | Schroeder | Oct. 28, 1958 |
| 2,969,426 | Moulton | Jan. 24, 1961 |

OTHER REFERENCES

Color TV, Rider Publication, March 1954, pages 141 and 142 of circuit diagrams.

RCA Color Television Receiver, Model CT-100, March 31, 1954, pages 31 to 34 of circuit diagrams.

UNITED STATES PATENT OFFICE

CERTIFICATE OF CORRECTION

Patent No. 3,084,212 April 2, 1963

Paul Raibourn

It is hereby certified that error appears in the above numbered patent requiring correction and that the said Letters Patent should read as corrected below.

Column 1, line 39, for "representatives" read -- representative --; lines 62 and 63, for "phosphor area" read -- color --.

Signed and sealed this 1st day of October 1963.

(SEAL)
Attest:

ERNEST W. SWIDER
Attesting Officer

DAVID L. LADD
Commissioner of Patents